United States Patent
Suzuki

[11] Patent Number: 5,815,923
[45] Date of Patent: Oct. 6, 1998

[54] BEARING AND METHOD OF MANUFACTURING THE SAME

[75] Inventor: Kiyoshi Suzuki, Tokyo, Japan

[73] Assignee: NEC Corporation, Tokyo, Japan

[21] Appl. No.: 601,504

[22] Filed: Feb. 14, 1996

[30]      Foreign Application Priority Data

Feb. 14, 1995  [JP]  Japan .................................. 7-025056

[51] Int. Cl.⁶ ............................. F16C 33/00; B23P 15/00
[52] U.S. Cl. ............... 29/898.02; 72/379.2; 29/898.048; 29/898.054; 29/898.056
[58] Field of Search ..................... 29/898.02, 898.048, 29/898.054, 898.056; 72/379.2, 368

[56]              References Cited

U.S. PATENT DOCUMENTS

| | | | |
|---|---|---|---|
| 2,427,756 | 9/1947 | West | 72/379.2 |
| 2,460,721 | 2/1949 | Thompson | 72/379.2 |
| 3,587,285 | 6/1971 | Gonzalez | 72/379.2 |
| 4,254,540 | 3/1981 | Bilak | 72/379.2 |
| 4,479,287 | 10/1984 | Asaka | 72/379.2 |
| 5,237,849 | 8/1993 | Miyazawa | 72/379.2 |

FOREIGN PATENT DOCUMENTS 64-47554   3/1989   Japan .

*Primary Examiner*—Larry I. Schwartz
*Assistant Examiner*—Marc W. Butler
*Attorney, Agent, or Firm*—Sughrue, Mion, Zinn, Macpeak & Seas, PLLC

[57]              ABSTRACT

A bearing includes a bearing portion and an oil basin. The bearing portion is formed integrally with a side frame and projects cylindrically from a surface of the side frame. The oil basin is integrally formed with the bearing portion and annularly provided to part of the bearing portion. The oil basin has a recessed groove for storing oil between a rotating shaft inserted in the bearing portion and an inner circumferential surface of the bearing portion. A method of forming the bearing is also disclosed.

7 Claims, 3 Drawing Sheets

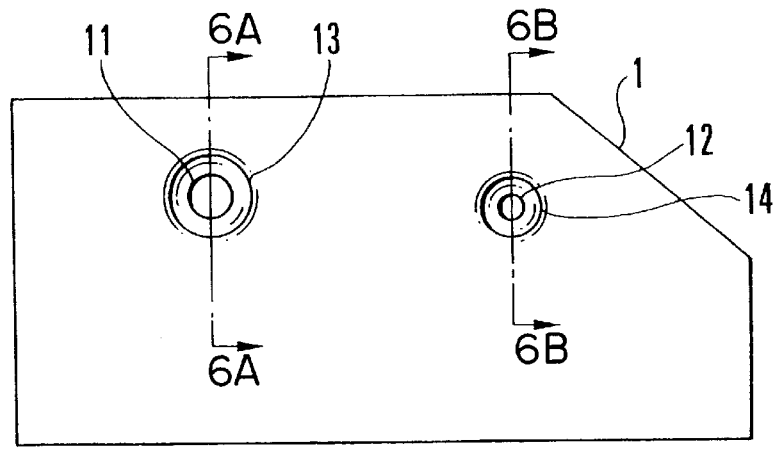
FIG. 5
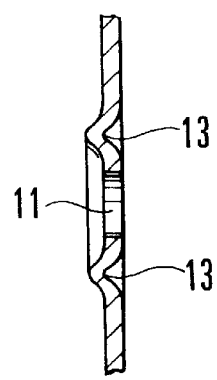  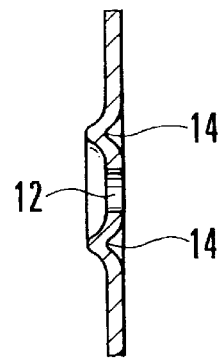
FIG. 6A  FIG. 6B
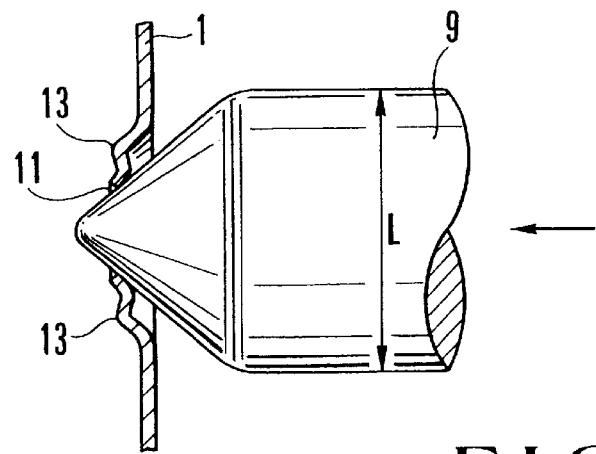
FIG. 7

# BEARING AND METHOD OF MANUFACTURING THE SAME

BACKGROUND OF THE INVENTION

The present invention relates to a bearing provided to a sheet metal structure, e.g., a frame or a bracket, and a method of manufacturing the same.

Regarding the conventional bearing structure of a rotating shaft, a bearing for receiving a shaft that rotates is manufactured by oil sintering or with a molded part of a polymer material, and this bearing is mounted and fixed to a structure, e.g., a frame or a bracket, by press fitting or the like. According to Japanese Utility Model Laid-Open No. 1-47554, a bearing ring corresponding to a bearing is mounted on a motor shaft portion that rotates.

Any one of the conventional bearing structures is obtained by press-fitting, screwing, or welding a component serving as a bearing to a frame structure that holds a rotating shaft, and requires a component other than the frame structure.

As a simple method of manufacturing a bearing, the burring scheme is available with which a hole is formed in a portion of a frame structure where a rotating shaft is to be inserted, and a rod-shaped tool or a rod-shaped member comprising a rod-shaped die having substantially the same diameter as that of the rotating shaft is forced in this hole, thereby forming a bearing. According to this scheme, a cylindrical projection is formed by press-fitting the rod-shaped tool, to serve as a bearing. More specifically, when the rod-shaped tool is removed and the rotating shaft is inserted in the cylindrical projection, the cylindrical projection forms a bearing. However, as the bearing manufactured by this scheme does not have an oil basin, it requires lubrication repeatedly in order to improve rotational slide. Also, oil supplied to the bearing drops soon to cause contamination.

SUMMARY OF THE INVENTION

It is an object of the present invention to provide a bearing integrally formed with a sheet metal structure to simplify constituent components, and a method of manufacturing the same.

It is another object of the present invention to provide a bearing in which an oil basin can be formed easily, and a method of manufacturing the same.

In order to achieve the above objects, according to an aspect of the present invention, there is provided a bearing comprising a bearing portion formed integrally with a sheet metal structure and projecting cylindrically from a surface of the sheet metal structure, and an oil basin integrally formed with the bearing portion and annularly provided to part of the bearing portion, the oil basin having a recessed groove for storing oil between a rotating shaft inserted in the bearing portion and an inner circumferential surface of the bearing portion.

BRIEF DESCRIPTION OF THE DRAWINGS

FIG. 5 is a front view showing a state wherein embossed grooves are formed in the side frame of FIG. 4;

FIGS. 6A and 6B are sectional views of the bearing portion of FIG. 5 taken along the lines B—B and C—C, respectively; and FIG. 7 is a sectional view of the main part showing a state of the side frame of FIG. 5 which is under burring.

DESCRIPTION OF THE PREFERRED EMBODIMENT

The present invention will be described in detail with reference to the accompanying drawings.

Figure 1:
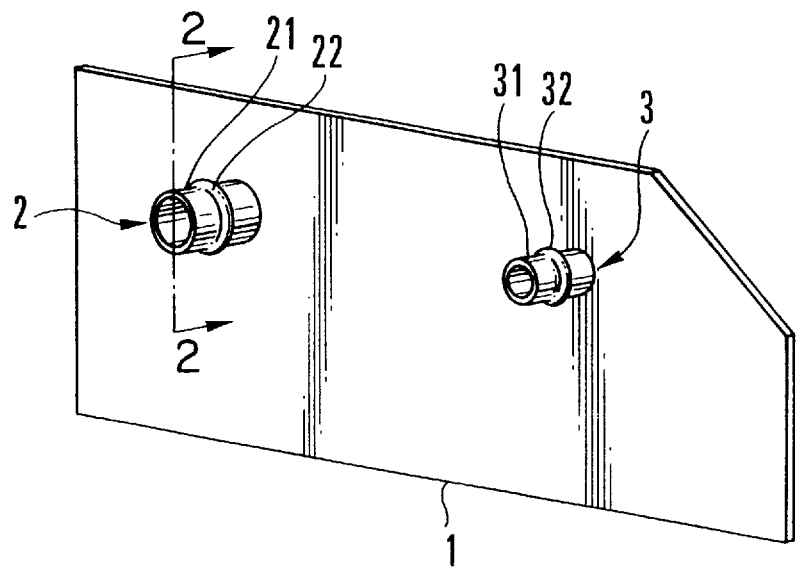
FIG. 1 is a perspective view showing a bearing according to an embodiment of the present invention.
Figure 2:
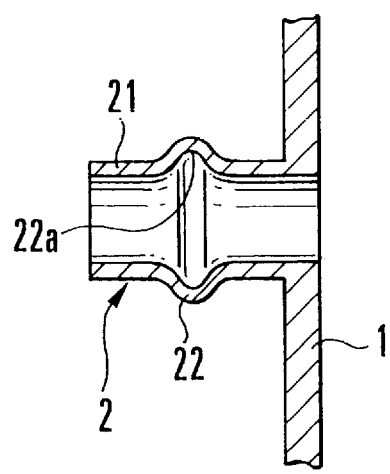
FIG. 2 is an enlarged sectional view of the bearing shown in FIG. 1 taken along the line A—A.

FIG. 1 shows a bearing according to an embodiment of the present invention, and FIG. 2 shows the bearing shown in FIG. 1 taken along the line A—A. Referring to FIG. 1, two bearings 2 and 3 having different diameters are integrally formed on a side frame 1 serving as a sheet metal structure to project from it. The bearings 2 and 3 have bearing portions 21 and 31 cylindrically projecting from the surface of the side frame 1, and oil basins 22 and 32 annularly formed at substantially the centers of the bearing portions 21 and 31, respectively. As shown in FIG. 2, the oil basin 22 of bearing 2 flexes from the outer circumferential surface of the bearing portion 21 to project outward, and has a recessed groove 22a having a diameter larger than the inner diameter of the bearing portion 21. Similarly to the bearing 2, the bearing 3 has the cylindrical bearing portion 31 and the oil basin 32 formed in the bearing portion 31 and having a recessed groove (not shown). The bearing 3 has an inner diameter smaller than the inner diameter of the bearing 2.

Figure 3:
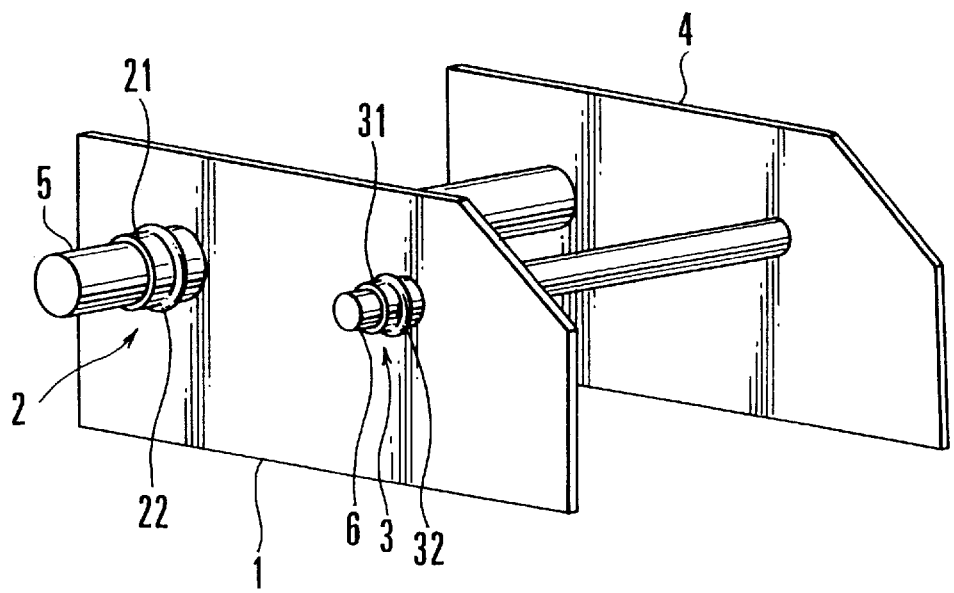
FIG. 3 is a perspective view showing a state wherein rotating shafts are mounted in a side frame shown in FIG. 1.

FIG. 3 shows an example of use of the bearing shown in FIG. 1 which is integral with the frame. Referring to FIG. 3, rotating shafts 5 and 6 have different diameters. One end of the rotating shaft 5 is held by the bearing 2 provided to the side frame 1, and the other end thereof is held by one bearing (not shown) of a side frame 4. One end of the rotating shaft 6 is held by the bearing 3 provided to the side frame 1, and the other end thereof is held by the other bearing (not shown) of the side frame 4. The two bearings (not shown) of the side frame 4 have the same arrangement as that of the bearings 2 and 3.

In this embodiment, after the rotating shafts 5 and 6 are inserted in the bearings 2 and 3, respectively, when a lubricant made of an oil or grease is supplied to a portion between the rotating shaft 5 and the bearing portion 21 of the bearing 2 and a portion between the rotating shaft 6 and the bearing portion 31 of the bearing 3, the oil is stored in the recessed groove 22a of the oil basin 22 and the recessed groove (not shown) of the oil basin 32. This decreases the coefficient of friction between the rotating shaft 5 and the inner circumferential surface of the bearing portion 21 and that between the rotating shaft 6 and the inner circumferential surface of the bearing portion 31, thereby improving the rotational slip of the rotating shafts 5 and 6. Also, the number of times of lubrication can be decreased. The oil or grease may be applied to the inner sides of the oil basins 22 and 32 before inserting the rotating shafts 5 and 6.

A method of manufacturing the bearing shown in FIG. 1 which is integral with the frame will be described. FIGS. 4 to 7 explain the bearing manufacturing method according to the present invention. Assume that the bearings 2 and 3 in the side frame 1 shown in FIG. 1 have an inner diameter of 15 mm and an inner diameter of 10 mm, respectively, and a thickness of 2 mm.

Figure 4:
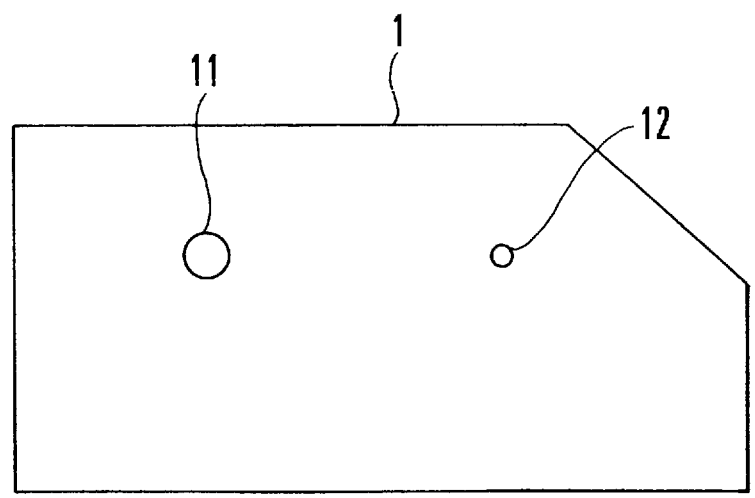
FIG. 4 is a front view showing a state wherein prepared holes are formed in the side frame.

As shown in FIG. 4, a prepared hole 11 having a diameter of 6 mm is formed at a portion of the side frame 1 where the bearing 2 is to be formed, and a prepared hole 12 having a diameter of 4 mm is formed at a portion of the side frame 1 where the bearing 3 is to be formed. The prepared holes 11 and 12 are formed by a press machine or the like.

As shown in FIG. 5, annular embossed grooves 13 and 14 having diameters larger than those of the prepared holes 11 and 12 are formed around the prepared holes 11 and 12, respectively. The embossed grooves 13 and 14 are formed by recessing portions that are outside the edges of the prepared holes 11 and 12 by 2 mm in the radial direction with an annular emboss forming punch or the like. The embossed grooves 13 and 14 have a depth about 0.8 times the thickness of the side frame 1, i.e., a depth of about 1.6 mm. FIGS. 6A and 6B show sections taken along the lines B—B and C—C, respectively, of FIG. 5.

As shown in FIG. 7, a rod-shaped tool or rod-shaped mold (to be referred to as a rod-shaped tool hereinafter) 9 is inserted in the prepared hole 11 of the side frame 1 and pressed to push out the peripheral portion of the prepared hole 11. Similarly, another rod-shaped tool 9 having a different diameter is inserted in the prepared hole 12 of the side frame 1 and pressed to push out the peripheral portion of the prepared hole 12. Each rod-shaped tool 9 has a tapered distal end and a diameter L larger than the diameter of the annular embossed groove 13 or 14. More specifically, the diameter L of the rod-shaped tool 9 press-fitted in the prepared hole 11 is almost 15 mm, and the diameter L of the rod-shaped tool 9 press-fitted in the prepared hole 12 is almost 10 mm. In accordance with the burring scheme with which such rod-shaped tools 9 are press-fitted and pushed out, the peripheral portions of the prepared holes 11 and 12 are pushed out from the side frame 1 up to the outer sides of the embossed grooves 13 and 14, to form the bearing portions 21 and 31 and simultaneously the oil basins 22 and 32 shown in FIGS. 1 and 2. In other words, the oil basins 22 and 32 are respectively formed by pushing out the embossed grooves 13 and 14 with the rod-shaped tools 9. Finally, the rod-shaped tools 9 are removed from the prepared holes 11 and 12, thereby forming the bearing portions 21 and 31, respectively.

In this embodiment, when the volumes of the oil basins 22 and 32 are to be increased, the depths or widths of the embossed grooves 13 and 14 may be increased. For example, when the side frame 1 has a plate thickness of as small as 1 mm or less, the embossed grooves are set to have large widths. When the side frame 1 has a plate thickness of 2 to 3 mm, the embossed grooves are set to have large depths. Both the depths and widths of the embossed grooves may be set in accordance with the material of the side frame 1.

The diameters of the embossed grooves 13 and 14 must respectively be smaller than the inner diameters of the bearing portions 21 and 31 of the bearings 2 and 3 that are to be formed finally, and must naturally be smaller than the diameters L of the corresponding rod-shaped tools 9. Otherwise, the embossed grooves 13 and 14 are not pushed out and the oil basins 22 and 32 are not formed. The prepared holes 11 and 12 are formed to facilitate burring, and formation of the prepared holes 11 and 12 is not always necessary. More specifically, the distal ends of the rod-shaped tools 9 may be abutted against the centers of the embossed grooves 13 and 14 and be press-fitted without forming the prepared holes 11 and 12. The rod-shaped tools 9 may be press-fitted by a press machine or the like.

As has been described above, according to the present invention, an annular groove is formed in a sheet metal structure, e.g., a frame or a bracket, by emboss formation of the like, and the annular groove is caused to project cylindrically from the sheet metal structure by burring, thereby forming a bearing integrally having an oil basin portion and a bearing portion. Thus, an inexpensive bearing having a high rigidity and not requiring a separate component can be obtained.

What is claimed is:

1. A method of manufacturing a single-piece bearing for receiving a shaft, said bearing including integral bearing and oil basin portions, said method comprising the steps of:

forming an annular embossed groove in an inner side of a sheet metal structure; and pressing a rod-shaped member inside the embossed groove and pushing out an opposite outer side of said sheet metal structure until an outer side of said embossed groove projects outwardly, thereby simultaneously forming in said sheet metal structure a hollow bearing portion, open on both ends thereof, and an integral oil basin portion in the form of a peripheral enlargement of said hollow bearing portion, said peripheral enlargement having an inner diameter greater than an outer diameter of the bearing portion.

2. A method according to claim 1, further comprising the step of forming, at a central portion of said embossed groove, a prepared hole in which a tapered distal end portion of said rod-shaped member is to be inserted.

3. A method according to claim 2, wherein said embossed groove has a diameter smaller than an inner diameter of said bearing portion to be formed and is smaller than a diameter of said rod-shaped member.

4. A method according to claim 4, wherein at least one of a width and depth of said embossed groove is changed to set a volume of said oil basin to a predetermined value.

5. A method of forming a bearing, having an integral oil basin, in a sheet metal structure adapted to support a shaft which is received in the bearing, said bearing being integral with the sheet metal structure which has a first inner surface and an opposite outer surface, said method comprising the steps of:

forming in said first surface of said sheet metal structure an annular groove having a diameter and a center;

pressing a rod-shaped member inside the annular groove to exert a force thereon in a direction from said first surface to said second surface, and to push out the sheet metal structure in said direction so as simultaneously to form both an outwardly projecting hollow cylindrical bearing portion, open on both ends thereof, and a peripheral enlargement integral therewith so that said enlargement has an inner diameter larger than the outer diameter of the formed hollow cylindrical bearing portion which serves as said oil basin for said bearing; and choosing the diameter of the annular groove to be smaller than the inner diameter of the formed hollow cylindrical bearing portion, and smaller than a diameter of said rod-shaped member.

6. The method according to claim 5, further comprising the step of, prior to said pressing step, forming a hole in the center of said annular groove, wherein said pressing step comprises inserting an end of said rod-shaped member in said hole and pressing until a peripheral edge of said hole is pushed out from said opposite surface of the sheet metal structure and up to the outer periphery of said annular groove simultaneously to form said hollow cylindrical bearing portion and said peripheral enlargement.

7. A method according to claim 6, further comprising the step of varying one of a width and a depth of said annular groove to determine a volume of the oil basin enlargement.

* * * * *